Nov. 26, 1963  R. W. KEITER  3,111,912
ROLLER ASSEMBLY FOR OPERATION ON A RAIL
Filed Jan. 31, 1962
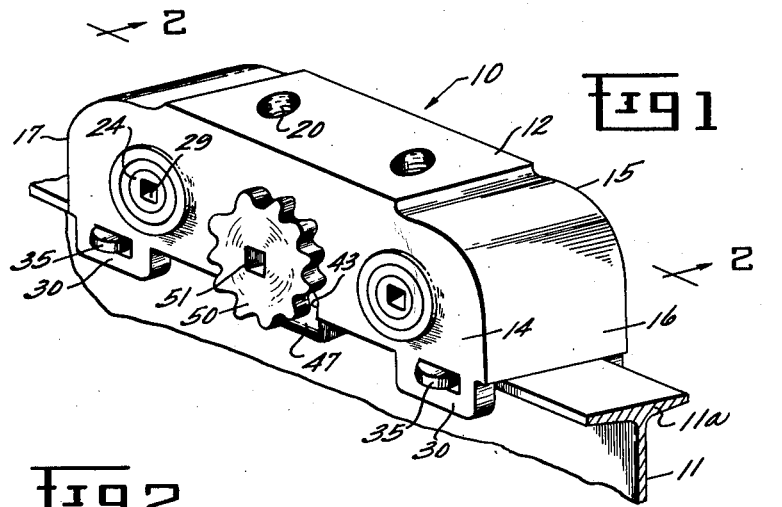
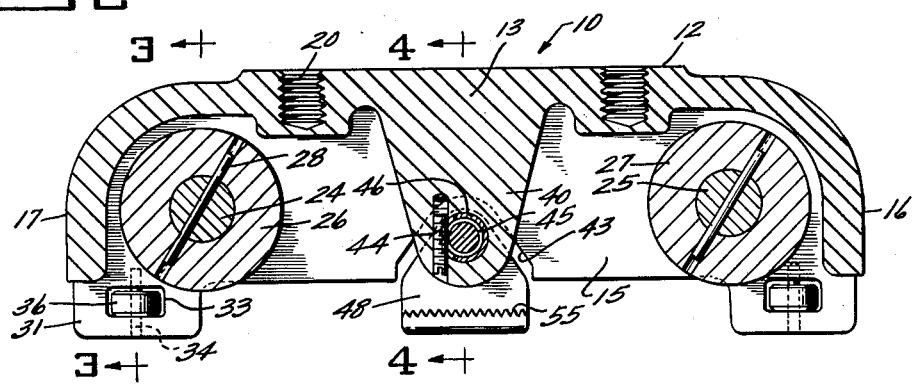
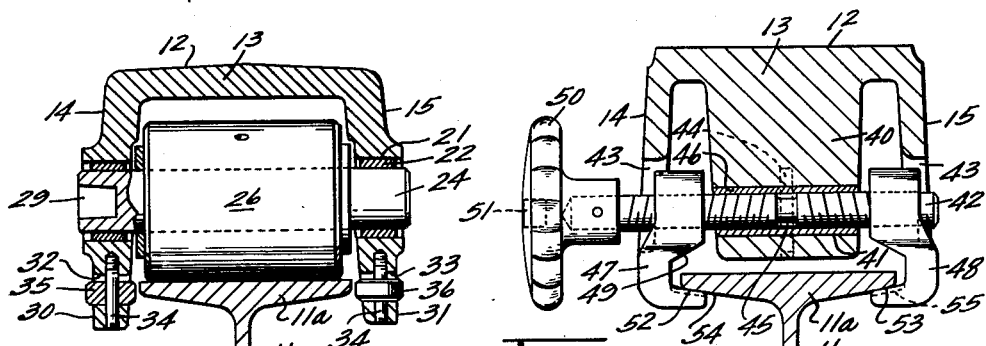
INVENTOR.
ROBERT W. KEITER
BY
Gerald L. Moore
ATTORNEY

United States Patent Office 3,111,912
Patented Nov. 26, 1963

3,111,912
ROLLER ASSEMBLY FOR OPERATION ON A RAIL
Robert W. Keifer, Cincinnati, Ohio, assignor to General Electric Company, a corporation of New York
Filed Jan. 31, 1962, Ser. No. 170,163
3 Claims. (Cl. 105—141)

This invention relates to a roller assembly and more specifically to such a roller assembly having a simplified design and an efficient brake assembly.

Frequently heavy apparatus, for instance aircraft engines and the like, must be supported after being removed from the airframe in a manner to allow their being moved short distances. For instance, in the overhaul of jet engines it is necessary not only to move the engines within the overhaul shops but also to be able to individually support the separate longitudinally spaced sections of the engine in a manner to allow their being moved apart in disassembly. Such a support means usually consists of an attachment means which fastens directly on the heavy apparatus and which in turn is attached to and supported by a roller assembly. The roller assembly must not only support the apparatus and attachment means, but must additionally allow its transportation about the shops or wherever desired. Such a roller assembly of this type should be of a simplified construction, portable and preferably small and lightweight. In addition to these qualities, the support must provide a means for locking the assembly in place once properly positioned.

Accordingly, it is an object of this invention to provide an improved and simplified roller assembly for supporting and transporting heavy equipment short distances.

It is another object of this invention to provide such a roller assembly having an efficient braking means to allow the assembly to be easily locked in an immovable position.

The present invention comprises a roller assembly for operation on a rail or other similar track having a housing of an inverted, substantially U-shaped cross-section with closed ends, and a pair of rollers rotatably supported within the housing which contact the rail and allow the assembly to be easily moved along the rail. A brake assembly is provided to lock the roller against movement on the rail consisting of a projection extending from inside the top of the housing between the rollers which rotatably supports a threaded member, with clamping members located on each side of the projection and threadably engaged with the threaded member which, when the threaded member is rotated, will clamp around the rail and press the rollers with the housing assembly tightly against the rail to lock the entire assembly stationary on the rail.

Other objects and many of the attendant advantages of this invention will be readily appreciated as the same becomes better understood by reference to the following detailed description when considered in connection with the accompanying drawings wherein:

FIG. 1 is a perspective view of the roller assembly positioned on a rail,

FIG. 2 is a cross-sectional view along the lines 2—2 of FIG. 1,

FIG. 3 is a cross-sectional view along the lines 3—3 of FIG. 2, and

FIG. 4 is a cross-sectional view along the lines 4—4 of FIG. 2 showing in particular the brake assembly.

Referring now to the drawings, therein is illustrated the roller adapter 10 positioned on a rail 11 having a top flange 11a for movement therealong. The roller assembly includes a housing 12 of an inverted substantially U-shaped configuration having a top wall member 13 and side walls 14 and 15, with the ends closed by extensions of the top wall member 13 forming end walls 16 and 17. In the top wall member 13 are provided threaded holes 20 for attaching a suitable bracket or support member (not shown) for the heavy apparatus being supported. In this manner the roller assembly may be used in a variety of jobs by simply changing this bracket member. Ordinarily a plurality of such roller assemblies are used in cooperation with a pair of tracks 11 parallel spaced with the apparatus being supported between the pair of tracks on these roller assemblies for movement along the tracks when desired.

Openings 21 are provided in the side walls 14 and 15 at each end of the roller assembly to house a bearing 22 which rotatably supports the shafts 24 and 25 within these side walls. Positioned on these shafts and between the side walls 14 and 15 are rollers 26 and 27 which are fastened to the shafts by means of pins 28 passing through aligned openings through both the roller and shaft. The rollers are positioned so that they extend a short distance below the end walls 16 and 17 and ride directly on the rail 11 to support the roller assembly. By providing a bearing support for the shafts, heavy machinery may be moved by nominal forces acting thereon since a minimum of frictional forces is encountered between the rotating shaft and the side walls. Also by locating this bearing assembly directly in the side walls, the weight forces of the load are transmitted directly from the housing into the shaft thereby providing simplicity in design. The flat sided openings 29 in the ends of the shafts 24 and 25 allow the insertion of a lever tool to further facilitate controlled movement of the roller assembly along the rail.

To maintain the roller assembly on the rail 11, side projections 30 and 31 are provided adjacent the rollers in the side walls 14 and 15, respectively. Openings 32 and 33 are provided in these side walls with a threaded member 34 passing through the side wall projections and through the center of these openings 32 and 33 to rotatably support rollers 35 and 36 within the openings in a manner so the rollers may bear against the side of the rail 11 with sufficient clearance to minimize friction and yet keep the roller assembly aligned with the rail. In this manner frictional forces between the roller assembly and the rail are further minimized because of the rolling engagement between the rollers 35 and 36 and the rail. Furthermore, these rollers are easily replaced in the event of wear or damage since only the threaded member 34 need be removed for removal of the individual rollers.

As mentioned heretofore, it is frequently necessary to lock the machinery being supported in a desired position. To allow this, a brake assembly is provided comprising a projection 40 extending from the top wall 13 between the rollers 26 and 27 with an opening 41 through which extends a threaded member 42. The threaded member 42 is locked in position yet allowed to rotate by means of a pin 44 extending through the projection 40 and adjacent the threaded member in the groove 45; this member further extends on through the cut out portions 43 in the side walls 14 and 15. To minimize wear and friction between the threaded member 42 and the projection 40 a bushing 46 is provided within the opening in the projection 40.

As illustrated in FIG. 4, the threaded member 42 has threads leading in the opposite direction on the opposite sides of the projection 40 with clamping members 47 and 48 threadably engaged therewith. These C-shaped members have a cut out portion 49 extending around the top flange of the rail 11 so that when these clamping members are moved sufficiently apart, they are positioned loosely on opposite sides of the rail without contacting the rail and allow the roller assembly to easily move along the rail. However, when the threaded member 42 is twisted by rotation of a suitable handle 50 attached to the threaded member outside the side wall 14, these clamping members 47 and 48 are forced toward the rail with the slightly canted or wedge shaped portions 52 and 53 contacting the bottom surface 54 of the top flange 11a of the rail 11. Upon further turning of the threaded member 42 the clamping members 47 and 48 are further moved in a direction toward one another and the wedged configuration of the surfaces 52 and 53 force the clamping heads 47 and 48 down towards the rail 11. The threaded member transmits this downward force up through the projection 40 and into the roller assembly housing to the rollers 26 and 27 to clamp the roller assembly tightly against the rail and prevent its movement either sidewise or longitudinally along the rail, a square drive opening 51 may be provided in the handle 50 to further assist in tightening the handle 50 by using a cooperating lever tool. By this assembly it can be seen that the complete roller assembly is locked against the rail and any play either between the threaded member and the projection 40 or within the bearings is immediately eliminated by the downward pull of the brake assembly. The brake assembly accomplishes this locking with a mechanism exemplifying simplicity in design and yet providing a high mechanical advantage through the interaction of the wedging surfaces 52 and 53 and the rail under surface 54. Further, by supporting the clamping members 47 and 48 from the threaded member 42 so as to allow a slight pivoting of these clamping members, any force tending to move the roller assembly longitudinally along the rail only serves to wedge these clamping members tighter against the rail, an action that is further assisted by providing the serrations 55 on the rail contacting surfaces of these clamping members.

It can be seen that the unique roller assembly described herein is characterized by a simplicity of design in the overall assembly with an efficient brake mechanism provided to lock the roller assembly to the rail when desired. While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A roller assembly for operation on a rail, comprising the combination of
    a housing,
    said housing having an inverted substantially U-shaped cross-section with closed ends,
    a pair of shafts rotatably supported between the housing sides,
    a roller mounted on each shaft,
    a brake to lock said roller assembly immovable on said rail comprising,
    a brake support member extending from inside the top of said housing between said rollers,
    a threaded member rotatably supported in said support member,
    means attached to said support member to allow turning said threaded member from outside said housing,
    a clamping member on each side of said support member threadably engaged with said threaded member,
    said clamping members, and the abutting surface of said rail having complemental engaging surfaces to allow a wedging action therebetween,
    whereby by rotation of said threaded member said clamping members are clamped around said rail to press said rollers tightly against said rail and lock said roller assembly immovable against said rail.

2. A roller assembly for operation on a rail, comprising the combination of
    a housing,
    said housing having an inverted substantially U-shaped cross-section with closed ends,
    a pair of shafts rotatably supported between the housing sides,
    a support roller mounted on each shaft to provide rolling engagement with said rail and support said roller assembly,
    side rollers supported from said housing to keep said support rollers aligned with said rail,
    a brake to lock said roller assembly immovable on said rail comprising,
    a brake support member extending from inside the top of said housing between said rollers,
    a threaded member rotatably supported in said support member,
    means attached to said support member to allow turning said threaded member from outside said housing,
    a clamping member on each side of said support member threadably engaged with said threaded member,
    said clamping members, and the abutting surface of said rail having complemental engaging surfaces to allow a wedging action therebetween,
    whereby by rotation of said threaded member said clamping members are clamped around said rail to press said rollers tightly against said rail and lock said roller assembly immovable against said rail.

3. A roller assembly for operation on a rail, comprising the combination of a housing,
    said housing having an inverted substantially U-shaped cross-section with closed ends,
    a pair of shafts rotatably supported between the housing sides,
    a support roller mounted on each shaft,
    a brake to lock said roller assembly immovable on said rail comprising,
    a brake support member extending from inside the top of said housing between said rollers,
    a threaded member rotatably supported in said support member,
    means to allow turning said threaded member from outside said housing,
    a C-shaped clamping member on each side of said support member threadably engaged with said threaded member,
    said C-shaped clamping members and the abutting surface of said rail having complemental engaging surfaces to allow a wedging action therebetween,
    whereby by rotation of said threaded member said clamping members are forced together to come into wedging engagement with the bottom of said rail and force said roller assembly against said rail to lock it immovable on said rail.

References Cited in the file of this patent

UNITED STATES PATENTS

| | | |
|---|---|---|
| 1,900,867 | Olds | Mar. 7, 1933 |
| 2,182,057 | Chicoine et al. | Dec. 5, 1939 |
| 2,448,478 | White | Aug. 31, 1948 |
| 2,848,242 | Taylor | Aug. 19, 1958 |